US008573552B2

(12) United States Patent
Andersson et al.

(10) Patent No.: US 8,573,552 B2
(45) Date of Patent: Nov. 5, 2013

(54) CUP HOLDER ASSEMBLY HAVING A PAIR OF LIDS AND A SINGLE RELEASE BUTTON

(75) Inventors: Christer Andersson, Trollhattan (SE); Odd Jaegtnes, Nygard (SE)

(73) Assignee: Lear Corporation, Southfield, MI (US)

( * ) Notice: Subject to any disclaimer, the term of this patent is extended or adjusted under 35 U.S.C. 154(b) by 198 days.

(21) Appl. No.: 13/179,702

(22) Filed: Jul. 11, 2011

(65) Prior Publication Data

US 2012/0074188 A1 Mar. 29, 2012

Related U.S. Application Data

(60) Provisional application No. 61/387,489, filed on Sep. 29, 2010.

(51) Int. Cl.
*A41F 1/00* (2006.01)
(52) U.S. Cl.
USPC .................. 248/311.2; 224/926; 296/37.14
(58) Field of Classification Search
USPC ............. 248/284.1, 299.1, 311.2, 313, 316.1; 224/282, 926; 296/24.1, 37.8, 37.14; 297/188.4; 220/230, 263, 810, 827, 220/848
See application file for complete search history.

(56) References Cited

U.S. PATENT DOCUMENTS

| 5,171,061 A | 12/1992 | Marcusen |
| 5,267,761 A | 12/1993 | Curtindale et al. |
| 5,284,314 A | 2/1994 | Misaras et al. |
| 5,505,516 A | 4/1996 | Spykerman et al. |
| 5,524,958 A | 6/1996 | Wieczorek et al. |
| 5,634,621 A | 6/1997 | Jankovic |
| 5,639,002 A | 6/1997 | Weitbrecht et al. |
| 6,019,334 A | 2/2000 | Shinomiya |
| 6,409,136 B1 | 6/2002 | Weiss et al. |
| 6,439,525 B1 | 8/2002 | Gehring et al. |
| 6,644,526 B2 | 11/2003 | Pegorier |
| 6,692,053 B1 | 2/2004 | Smith |
| 6,708,938 B2 | 3/2004 | Bong |

(Continued)

FOREIGN PATENT DOCUMENTS

| DE | 4200823 A1 | 7/1993 |
| DE | 4306935 C1 | 7/1994 |

(Continued)

OTHER PUBLICATIONS

International Search Report, Application No. PCT/US2011/027022, dated Nov. 15, 2011.

(Continued)

*Primary Examiner* — Gwendolyn Baxter
(74) *Attorney, Agent, or Firm* — MacMillan, Sobanski & Todd, LLC

(57) ABSTRACT

A cup holder assembly includes a base and a pair of lid assemblies. The lid assemblies are respectively supported on the base for movement between an opened position and a closed position, wherein the lid assemblies are separately biased in the opened position. A pair of locking tabs is supported on the base for movement relative to the lid assemblies, wherein the locking tabs are configured to respectively engage and secure the lid assemblies in the closed position. A release member is supported on the base for movement relative to the locking tabs, wherein the release member is configured to disengage the locking tabs from the lid assemblies when the release member is moved from a first position to a second position.

22 Claims, 6 Drawing Sheets

(56) References Cited

U.S. PATENT DOCUMENTS

| | | |
|---|---|---|
| 6,764,053 B1 | 7/2004 | Han |
| 6,776,381 B1 | 8/2004 | Gisch |
| 6,969,035 B2 | 11/2005 | Leopold et al. |
| 6,997,509 B2 | 2/2006 | Kain |
| 7,025,316 B2 | 4/2006 | Schaal |
| 7,104,580 B2 | 9/2006 | Clark et al. |
| 7,225,957 B2 | 6/2007 | Kogami |
| 7,578,406 B2 | 8/2009 | Katagiri |
| 2003/0071047 A1* | 4/2003 | Harada ............ 220/835 |
| 2007/0013202 A1 | 1/2007 | Tompson |
| 2009/0095764 A1 | 4/2009 | Schaal |

FOREIGN PATENT DOCUMENTS

| | | |
|---|---|---|
| DE | 9306415 U1 | 9/1994 |
| DE | 4415732 A1 | 11/1995 |
| DE | 29810872 U1 | 8/1998 |
| DE | 10149616 A1 | 4/2003 |
| DE | 10215152 A1 | 10/2003 |
| DE | 202005003638 U1 | 5/2005 |
| DE | 202005003650 U1 | 5/2005 |
| DE | 102006003320 A1 | 8/2007 |
| DE | 102008033326 A1 | 12/2009 |
| EP | 1655169 A2 | 5/2006 |
| EP | 2172134 A1 | 4/2010 |
| JP | 6191339 A | 7/1994 |
| JP | 6336136 A | 12/1994 |
| JP | 2003245162 A | 9/2003 |
| JP | 2007290458 A | 11/2007 |
| JP | 2012056533 A * | 3/2012 |
| KR | 100559704 B1 | 3/2006 |

OTHER PUBLICATIONS

German Search Report, Application No. 102011083457.5, dated Oct. 16, 2012.

* cited by examiner

CUP HOLDER ASSEMBLY HAVING A PAIR OF LIDS AND A SINGLE RELEASE BUTTON

CROSS-REFERENCE TO RELATED APPLICATIONS

This application claims the benefit of U.S. Provisional application No. 61/387,489 filed Sep. 29, 2010, the disclosure of which is incorporated herein by reference.

BACKGROUND OF THE INVENTION

This invention relates in general to cup holder assemblies, such as can be used within a passenger compartment of a vehicle. In particular, this invention relates to an improved structure for a cup holder assembly that is compact, cost effective, and simple to operate.

Cup holder assemblies are generally known for supporting various objects, such beverage containers and the like, within a passenger compartment of a vehicle. A typical cup holder assembly includes one or more recessed areas within which the lower ends of the objects to be supported are inserted. When disposed within the cup holder assembly, the objects are supported to prevent tipping. However, the objects can be easily removed from the cup holder assembly for use and subsequently returned thereto. Cup holder assemblies of this general type are frequently supported on a console or an armrest of a seat assembly in order to provide easy access thereto.

For space-saving, aesthetic, and other reasons, the cup holder assembly may include one or more components that are movable between a closed position and an opened position. For example, some cup holder assemblies are provided with a drawer-style support element that is selectively movable between an extended position and a retracted position. Other cup holder assemblies are provided with a support element that is vertically extendable from a lower position to an upper position. Still other cup holder assemblies include a stationary base having a pair of lids that are configured for movement between a closed position and an opened position.

Although known cup holder assemblies function in a satisfactory manner, they generally incorporate relatively complex and costly operating mechanisms. Thus, it would be desirable to provide an improved structure for a cup holder assembly that is compact, cost effective, and simple to operate.

SUMMARY OF THE INVENTION

This invention relates to an improved structure for a cup holder assembly, such as can be used within a passenger compartment of a vehicle. The cup holder assembly includes a base and a pair of lid assemblies. The lid assemblies are respectively supported on the base for movement between an opened position and a closed position, wherein the lid assemblies are individually biased toward their opened position. A pair of locking tabs is supported on the base for movement relative to the lid assemblies, wherein the locking tabs are configured to respectively engage and secure the lid assemblies in the closed position. A release member is supported on the base for movement relative to the locking tabs, wherein the release member is configured to disengage the locking tabs from the lid assemblies when the release member is moved from a first position to a second position.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
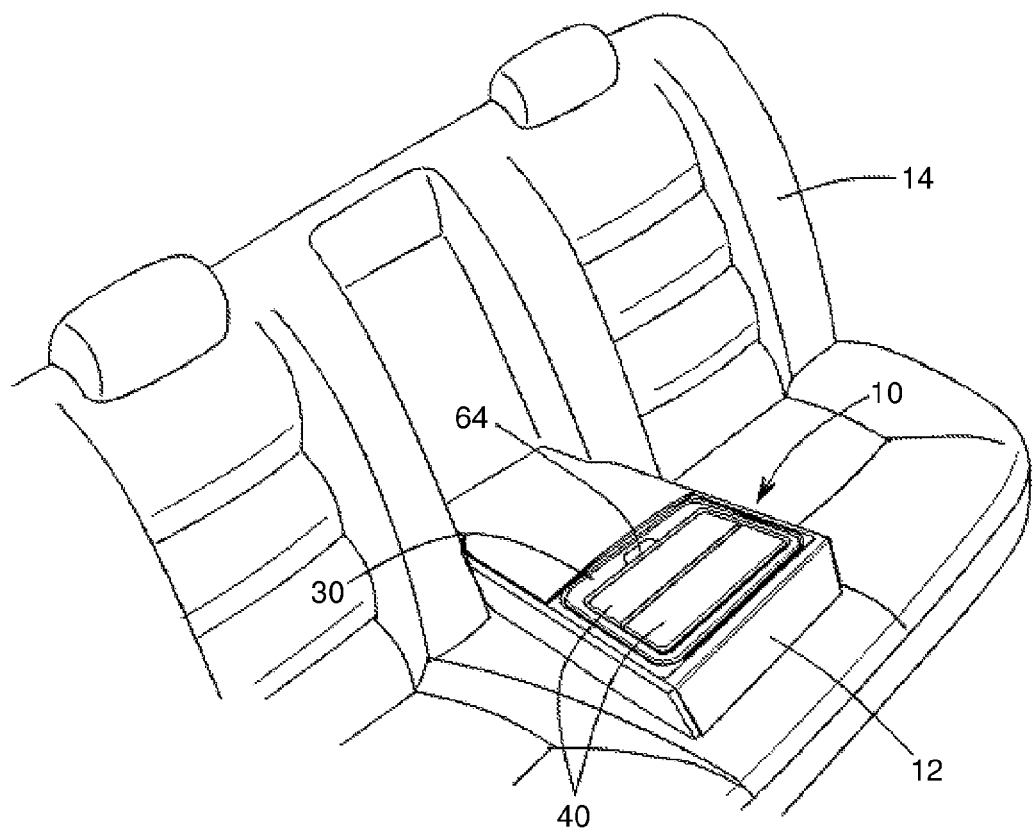
FIG. 1 is a perspective view of a vehicle seat assembly that includes an armrest having a cup holder assembly in accordance with this invention provided therein, wherein the cup holder assembly is shown in a closed position.

Referring now to the drawings, there is illustrated in FIG. 1 a cup holder assembly, indicated generally at 10, in accordance with this invention. The illustrated cup holder assembly 10 is mounted on an armrest 12 of a seat assembly 14 that can, for example, be provided within a passenger compartment of a vehicle. As will be explained below, the cup holder assembly 10 may be configured to support various objects (not shown) within the passenger compartment, including but not limited to beverage containers and the like. Although the cup holder assembly 10 will be described and illustrated for use in a passenger compartment of a vehicle, it should be appreciated that the cup holder assembly 10 may be used in any desired environment and for any desired purpose.

Figure 2:
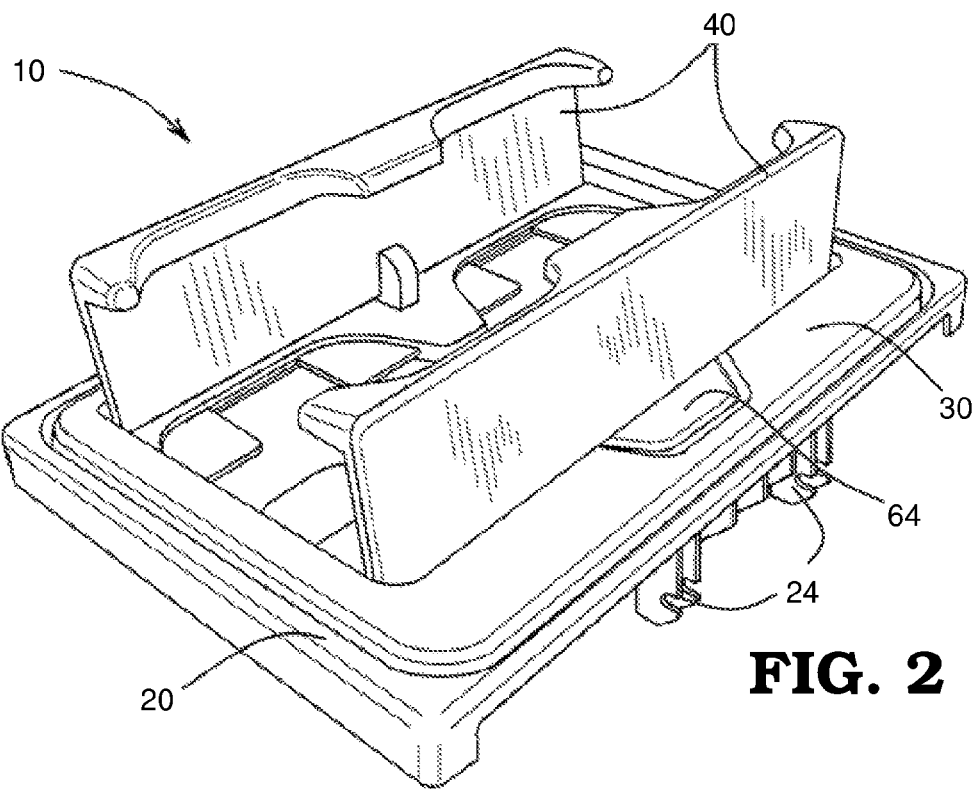
FIG. 2 is an enlarged perspective view of the cup holder assembly illustrated in FIG. 1 shown in an opened position.
Figure 3:
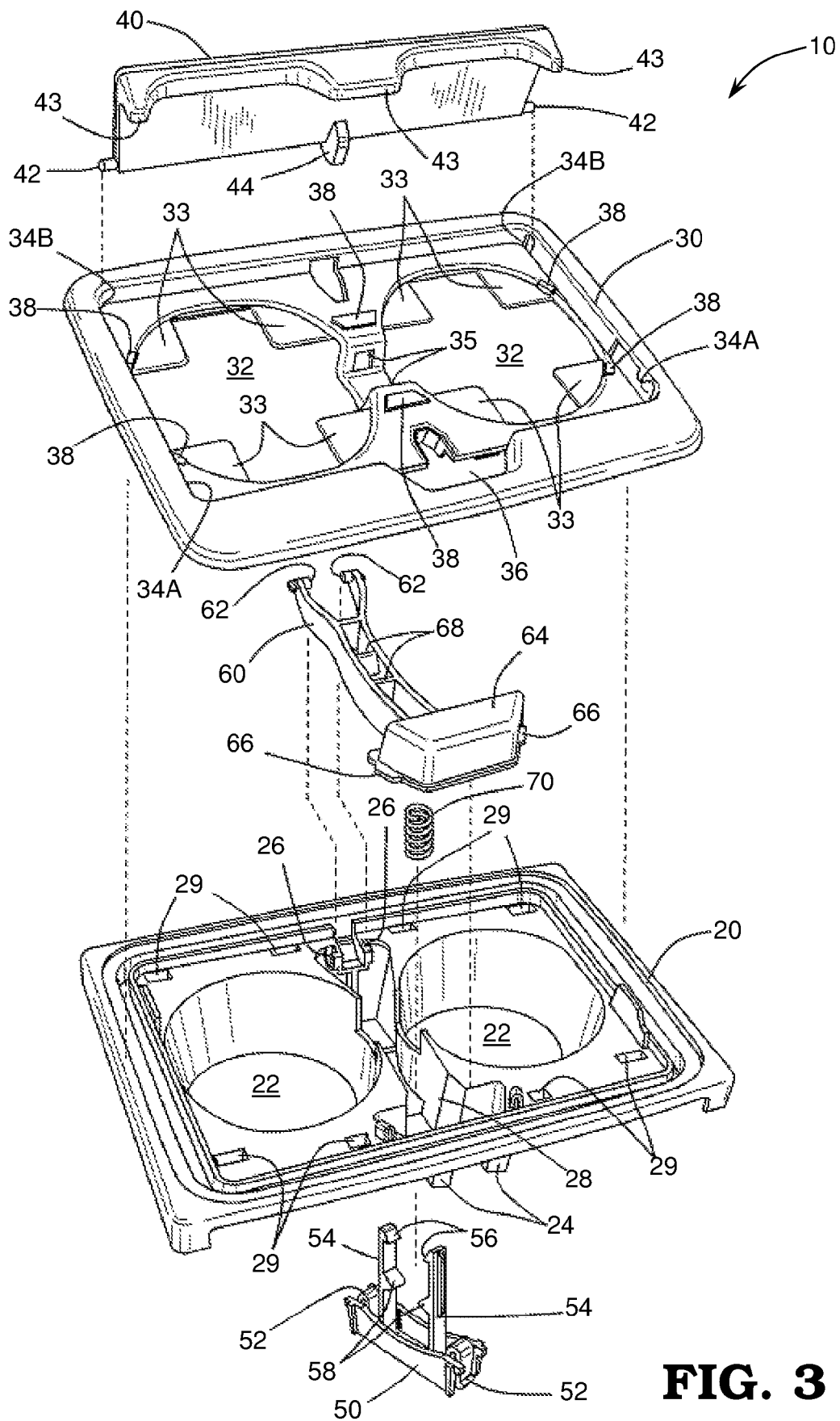
FIG. 3 is an exploded perspective view of the components of the cup holder assembly illustrated in FIGS. 1 and 2, wherein a lid assembly has been removed for clarity.

Referring now to FIGS. 2 and 3, the illustrated cup holder assembly 10 includes a base 20. The base 20 is configured to mount the cup holder assembly 10 to the armrest 12 (see FIG. 1) and support beverage containers (not shown) therein, as will be further explained below. The base 20 may have a generally rectangular shape, as shown, or any other desired shape. Further, the base 20 can be formed from any suitably rigid material, such as molded plastic for example.

The illustrated base 20 includes a pair of receptacles 22 that are located adjacent to one another. Each of the illustrated receptacles 22 is defined by a generally cylindrical wall and a bottom. However, the receptacles 22 may have any desired shape or structural features as desired. Although a pair of adjacent receptacles 22 is illustrated, it should be appreciated that the cup holder assembly 10 may include any number or configuration of receptacles 22, such as a single receptacle for example.

The base 20 may also include a plurality of mounting members 24 provided thereon. The mounting members 24 can be configured in any manner to secure the cup holder assembly 10 to the armrest 12 (see FIG. 1). For example, the mountings members 24 may be resilient tabs or the like for engaging a frame (not shown) of the armrest 12. Alternatively, the mounting members 24 can be rigid support posts that are configured to receive fasteners or other connectors. The mounting members 24 can be integrally formed with the base 20 or may be separate components that are attached thereto if so desired.

The illustrated base 20 also includes a pair of hinge supports 26, although such are not required. The illustrated hinge supports 26 each define a generally semi-circular structure having edges that are spaced apart and configured to receive a pivot pin therein, as will be explained below. The illustrated hinge supports 26 face outwardly away from one another, although they may alternatively face inwardly toward one another or in the same direction. The base 20 may include any number and configuration of the hinge supports 26 as desired.

The illustrated base 20 also includes a slot 28 that extends into an upper surface thereof, the purpose of which will be explained below. As shown, the slot 28 is an elongated pocket that extends between the adjacent pair of receptacles 22. The slot 28 may also have an enlarged end portion to receive a release button, as will be described below. It should be appreciated that the slot 28 can have any shape for a desired application and may be located along any portion of the base 20.

The base 20 may also include a plurality of mounting holes 29, the purposes of which will also be explained below. The mounting holes 29 can extend into the upper surface of the base 20. The mounting holes 29 may also define any shape or size. It should become apparent that the base 20 may include any number and configuration of mounting holes 29 as desired The illustrated cup holder assembly 10 includes a cover assembly 30. As shown, the cover assembly 30 is mounted on the base 20 and defines an outer surface of the cup holder assembly 10. Thus, the cover assembly 30 may include any aesthetic features, including but not limited to surface contours, visual designs, and the like. In an alternative embodiment, the cover assembly 30 is not required in that any structural features thereof may be integrally formed with the base 20 if so desired.

As shown in FIG. 2, the cover assembly 30 defines a pair of main openings 32 that generally correspond with the receptacles 22 of the base 20. For example, the illustrated openings 32 are generally round in shape and positioned adjacent to one another. Although a pair of adjacent openings 32 is illustrated, it should be appreciated that the cover assembly 30 may include any number, shape, or configuration of openings 32.

The illustrated cover assembly 30 also includes a plurality of support members 33, although such are not required. The support members 33 can be configured in any manner to provide lateral support to beverage containers (not shown) or other objects that are disposed within the receptacles 22. For example, the illustrated support members 33 are secured to an edge of the openings 32 and extend into the receptacles 22 for contact with an outer surface of a beverage container disposed therein. Thus, the support members 33 can be formed from a flexible material such as polymers or the like. Alternatively, the support members 33 can be rigid components that are pivotably supported to the cover assembly 30 for biased engagement with the beverage container. The cover assembly 30 may include any number, shape, or configuration of support members 33 as desired.

The illustrated cover assembly 30 also includes a first pair of apertures 34A and a second pair of apertures 34B, the purposes of which will be explained below. As shown, the first and second pair of apertures 34A, 34B extend through side walls of the cover assembly 30 and are axially aligned with one another, although neither of which are required. At least one of the apertures in each of the pair of apertures 34A, 34B may include an elongated section to facilitate insertion of a pivot pin therein, as will be explained below. The illustrated first and second pair of apertures 34A, 34B are spaced apart from one another and located near respective front and rear edges of the cover assembly 30. However, it should be appreciated that the first and second pair of apertures 34A, 34B can be configured in any manner for a desired application.

The cover assembly 30 may also include a pair of access holes 35, the purposes of which will also be explained below. As shown, the access holes 35 extend through opposing walls of the cover assembly 30 that are located between the openings 32. Thus, the access holes 35 provide communication with the slot 28 of the base 20. It should be appreciated, however, that the access holes 35 can be located along any portion of the cover assembly 30 or may be alternatively configured for a desired application.

The cover assembly 30 may also include a recess 36 that is configured to receive a release button 64, as will be explained below. For example, the illustrated recess 36 extends through a surface of the cover assembly 30 and provides communication with the slot 28 of the base 20. The recess 36 can have any desired shape or sized so as to generally conform to the release button 64. As shown, the recess 36 is located between the pair of openings 32 near an edge of the cover assembly 30. However, the recess 36 can be located along any portion of the cover assembly 30 as desired.

The illustrated cover assembly 30 also includes a plurality of dampeners 38, although such are not required. The dampeners 38 are configured to eliminate or reduce noise and vibrations that may result from contact between various components of the cup holder assembly 10. The illustrated dampeners 38 are secured to an upper surface of the cover assembly 30. The dampeners 38 can be formed from any vibration absorbing material, such as polymers or the like. It should be appreciated that the cover assembly 30 can include any number, shape, or configuration of dampeners 38. The dampeners 38 may also be located on any other portion or component of the cup holder assembly 10 as desired.

The cover assembly 30 may also include a plurality of mounting members 39 (see FIG. 7), although such are not required. The mounting members 39 are configured to secure the cover assembly 30 to the base 20. For example, the mounting members 39 can be resilient tabs, alignment posts, pins, or any other structural elements that extend from the cover assembly 30. The mounting members 39 can be aligned with the mounting holes 29 and received therein when the cover assembly 30 is properly positioned relative to the base 20. This arrangement enables the cover assembly 30 to be aligned with and snapped onto the base 20 with relative ease. Alternatively (or in addition), the cover assembly 30 can be secured to the base 20 in any other manner, including but not limited to separate fasteners, an adhesive, or a fused connection.

The cup holder assembly 10 includes a pair of lid assemblies 40, as shown in FIGS. 1 and 2. The illustrated lid assemblies 40 are supported on the cover assembly 30 for pivoting movement between a closed position (see FIG. 1) and an opened position (see FIG. 2). It should be appreciated, however, that the lid assemblies 40 can be mounted to any other component of the cup holder assembly 10, such as the base 20 for example.

The illustrated lid assemblies 40 are generally identical to one another, although such is not required. Thus, only one lid assembly 40 will be described in further detail. As shown in FIG. 3, the lid assembly 40 includes a pair of pivot pins 42. The pivot pins 42 are configured to pivotably support the lid assembly 40 to the cover assembly 30. The illustrated pivot pins 42 are cylindrical in shape and extend outwardly from opposite sides of the lid assembly 40. As shown, the pivot pins 42 are aligned along an axis of rotation. The pivot pins 42 are respectively inserted into one of the first and second pair of apertures 34A, 34B that are provided in the cover assembly 30, as will be described in detail below. It should be appreciated that the pivot pins 42 can be integrally formed with the lid assembly 40 or may be separate components that are attached thereto if so desired. Further, the pivot pins 42 are not required in that the lid assembly 40 can be pivotably supported on the cover assembly 30 using any components, such as a hinge (not shown) or the like.

The lid assembly 40 may also define one or more support members 43. The support members 43 may be configured in any manner to provide lateral support to beverage containers (not shown) or other objects that are disposed within the receptacles 22. For example, the support members 43 can extend outwardly from inner surface of the lid assembly 40 and be positioned near an upper edge thereof. Thus, when the lid assembly 40 is in the opened position the support members 43 are configured to contact an outer surface of the beverage container at a height above the cover assembly 30. The illustrated support members 43 have a generally semi-circular shape that generally corresponds with the beverage container, although any other shape may be incorporated. It should be appreciated that the support members 43 can be contoured surfaces that are integrally formed with the lid assembly 40. Alternatively, the support members 43 may be separate components that are secured to the lid assembly 40 in any manner.

The illustrated lid assembly 40 also includes a pivot stop 44, although such is not required. The pivot stop 44 is configured to prevent the lid assembly 40 from pivoting beyond a desired position. For example, the pivot stop 44 extends outwardly from a bottom edge of the lid assembly 40. The pivot stop 44 thus engages a portion of the base 20 or the cover assembly 30 when the lid assembly 40 reaches the opened position (see FIGS. 12 and 13). The pivot stop 44 may, however, be configured in any manner for a desired application. Further, the pivot stop 44 can be integrally formed with the lid assembly 40 or, alternatively, may be a separate component that is secured thereto.

Figure 4:
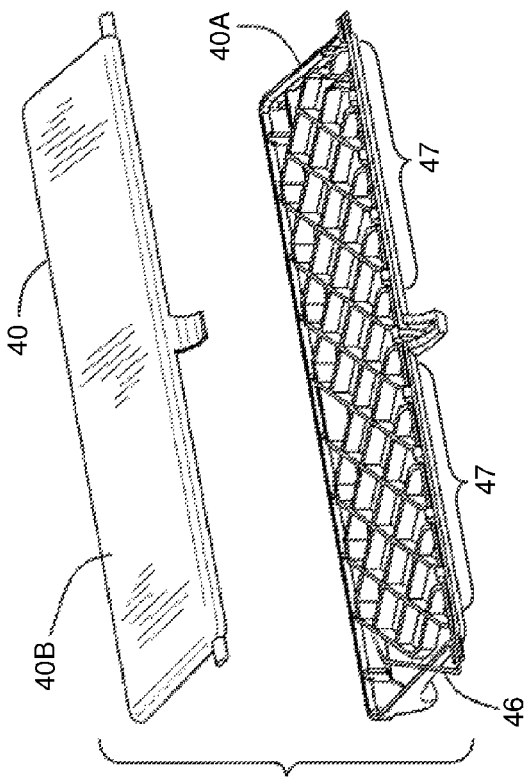
FIG. 4 is an exploded perspective view of one of the lid assemblies shown in FIGS. 1, 2, and 3.

Referring now to FIG. 4, the lid assembly 40 is illustrated in an unassembled position. The lid assembly 40 includes a first or internal shell 40A and a second or external shell 40B that are secured together. The first and second shells 40A, 40B may include internal ribs or other structural features for added strength if so desired. It should be appreciated that the first and second shells 40A, 40B can be formed from any rigid material, such as a plastic, using a molding process or any other process.

The illustrated lid assembly 40 also includes a spring member 46 that is configured to bias the lid assembly 40 toward the opened position, as will be explained below. As shown, the spring member 46 is a torsion spring having a generally elongated body portion with first and second ends that laterally extend outwardly therefrom. The first and second ends of the spring member 46 can be rotated relative to one another for generating torque therebetween as a result of torsion in the body portion. It should be appreciated, however, that the spring member 46 can be any component that is configured to bias the lid assembly 40 toward the opened position, such as a tension spring, compression spring, or the like.

Figure 5:
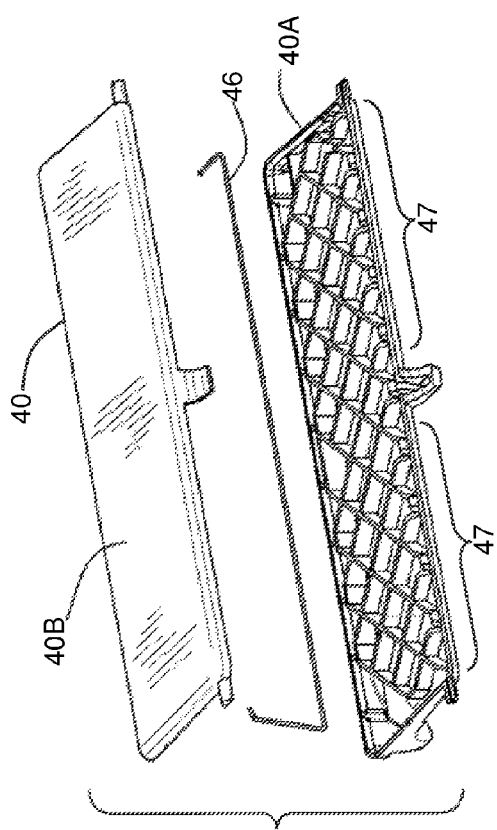
FIG. 5 is an exploded perspective view similar to FIG. 4 showing the lid assembly partially assembled.

As shown in FIG. 5, the spring member 46 is initially mounted along an inner surface of the first shell 40A. For example, the first shell 40A may define a groove 47 that is formed along the internal ribs. The groove 47 can be configured in any manner to receive and/or secure the spring member 46 therein. The first end of the spring member 46 may be secured between the first and second shells 40A, 40B along any length thereof. The second end of the spring member 46 may extend outwardly from the lid assembly 40, the purpose of which will be explained.

Figure 6:
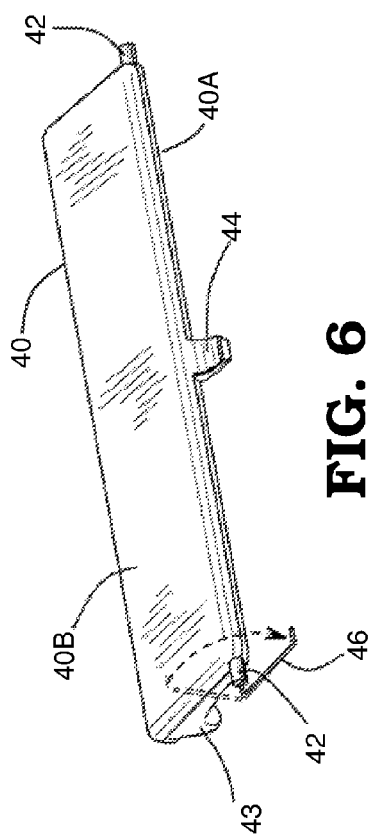
FIG. 6 is a perspective view similar to FIG. 5 showing the lid assembly fully assembled.

As shown in FIG. 6, the first and second shells 40A, 40B are then secured together to form the lid assembly 40. To accomplish this, at least one of the first shell 40A and the second shell 40B may include a plurality of resilient tabs (not shown) that engage respective portions of the corresponding shell. Alternatively, the first and second shells 40A, 40B can be secured together in any other manner, including but not limited to separate fasteners, an adhesive, or a fused connection.

The illustrated second end of the spring member 46 extends outwardly from the lid assembly 40 through one of the pivot pins 42. Prior to installing the lid assembly 40 to the cover assembly 30, the second end of the spring member 46 is pivoted from an unbiased position to a biased position, as illustrated by the broken lines and broken arrow in FIG. 6. This generates torque in the spring member 46, which is used to bias the lid assembly 40 toward the opened position.

Figure 7:
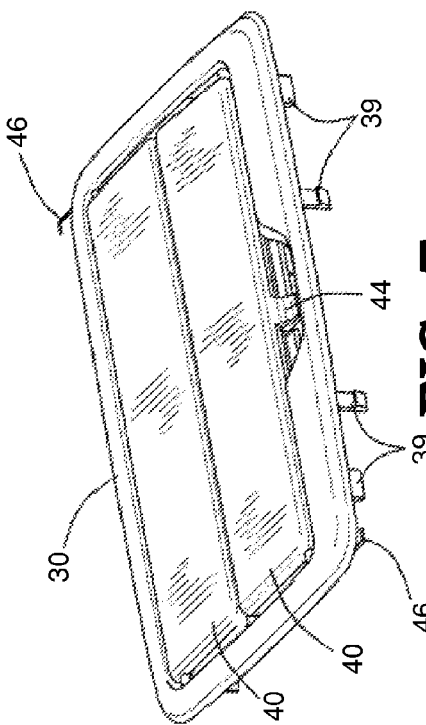
FIG. 7 is a perspective view of a pair of lid assemblies shown in FIG. 6 installed on a cover assembly of the cup holder assembly illustrated in FIGS. 1, 2, and 3.

Referring now to FIG. 7, the lid assembly 40 is then installed on the cover assembly 30. To accomplish this, the second end of the spring member 46 is initially inserted (while in the biased position) into an aperture of the first and second pair of apertures 34A, 34B (not shown) of the cover assembly 30. The corresponding pivot pin 42 (not shown) from which the spring member 46 extends is subsequently inserted into the same aperture. The opposite pivot pin 42 (also not shown) is then inserted into the corresponding aperture of the first and second pair of apertures 34A, 34B (i.e. the slotted aperture) and snapped into place. As shown, the second end of the spring member 46 engages a bottom surface of the cover assembly 30. The first end of the spring member 46 (not shown) engages an inner surface of the lid assembly 40. As a result of the torque generated in the spring member 46, the lid assembly 40 is biased toward the opened position (see FIG. 2). The same procedure can be repeated for the other lid assembly 40.

Figure 8:
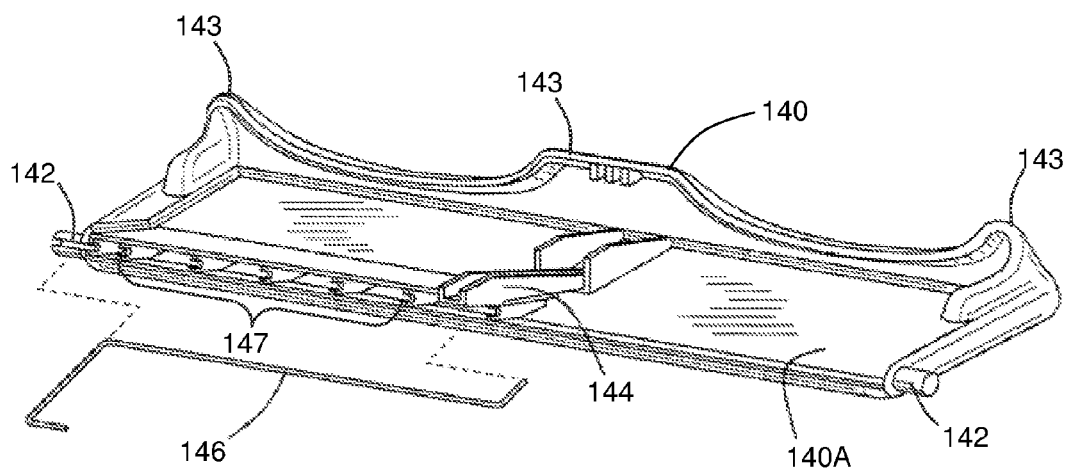
FIG. 8 is an exploded perspective view of a second embodiment of a lid assembly in accordance with this invention shown in an unassembled position.
Figure 9:
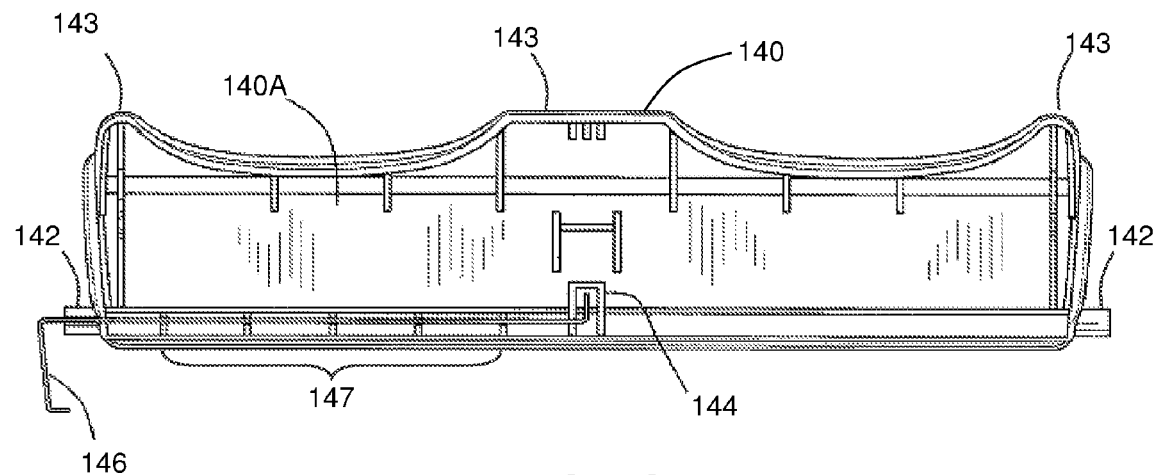
FIG. 9 is an end view of the lid assembly illustrated in FIG. 8 shown in an assembled position.

Referring now to FIGS. 8 and 9, there is illustrated a lid assembly 140 in accordance with a second embodiment of this invention. The lid assembly 140 may include any structural features as described and illustrated above in the first embodiment, although such is not required. Similar features have been numbered with common reference numerals but have been increased by 100 (i.e. 140, 142, 144, etc.). It should be appreciated that similar features are structured similarly, operate similarly, and/or have the same function unless otherwise indicated by the drawings or this specification.

As shown in FIG. 8, the illustrated lid assembly 140 includes a single shell 140A. The illustrated shell 140A includes a pair of pivot pins 142, a plurality of support elements 143, and a pivot stop 144, although such are not required. The shell 140A may be formed from any rigid material, such as a plastic, using a molding process or any other process.

The illustrated lid assembly 140 also includes a spring member 146 that is configured to bias the lid assembly 140 in an opened position. As shown, the spring member 146 is a torsion spring that includes a generally elongated body portion having first and second ends that laterally extend outwardly therefrom. It should be appreciated, however, that the spring member 146 can be any component that is configured to bias the lid assembly 140 in the opened position, such as a tension spring, compression spring, or the like.

As shown in FIG. 9, the lid assembly 140 is illustrated in an assembled position. In the assembled position, the spring member 146 is secured to the shell 140A and extends along an inner surface thereof. For example, the shell 140A may define a groove 147 that is formed by a plurality of support ribs or the like, although such is not required. The groove 147 can be configured in any manner to receive and/or secure the spring member 146 to the shell 140A.

For example, the illustrated groove 147 opens toward a lower edge of the shell 140A such that the elongated portion of the spring member 146 is disposed within a portion of the lid assembly 140. The spring member 146 partially extends along a length of the shell 140A such that the first end of the spring member 146 is concealed beneath the pivot stop 144. The second end of the spring member 146 extends outwardly from the shell 140A through a groove that is formed in one of the pivot pins 142 and is concealed by the cover assembly 30 (not shown). Thus, the spring member 146 is fully concealed from the passenger's view when the lid assembly 140 is in both the open and closed positions.

Referring back to FIG. 3, the illustrated cup holder assembly 10 also includes a locking mechanism 50. As shown, the locking mechanism 50 is configured to be secured to the base 20. Thus, the locking mechanism 50 includes a pair of mounting tabs 52. For example, the mounting tabs 52 may laterally extend outwardly from a portion of the locking mechanism 50 for engagement with the base 20. As shown in FIG. 3, the locking mechanism 50 is inserted upwardly into the slot 28 of the base 20 and snapped into place by the mounting tabs 52. Alternatively, the locking mechanism 50 may be otherwise secured to the base 20 such as with separate fasteners, an adhesive, or a fused connection for example. In yet another alternative embodiment, the locking mechanism 50 may be mounted to the cover assembly 30 or any other part of the cup holder assembly 10 if so desired.

The illustrated locking mechanism 50 also includes a pair of locking tabs 54. The locking tabs 54 are configured to respectively engage each of the lid assemblies 40 and secure them in the closed position. As such, the illustrated locking tabs 54 extend upwardly from a portion of the locking mechanism 50 and are pivotable relative to one another. The locking tabs 54 can be integrally formed with the locking mechanism 50 from any resilient material or, alternatively, may be separate components that are secured thereto using a hinged connection or the like. As will become apparent, the locking tabs 54 extend into the slot 28 of the base 20 when the locking mechanism 50 is secured thereto.

Each of the illustrated locking tabs 54 includes an end portion 56. The end portions 56 are configured to respectively engage the lid assemblies 40 for securing the lid assembly 40 in the closed position. For example, the illustrated end portion 56 defines an edge that laterally extends inwardly from the locking tab 54 and faces opposite the biased direction of pivotable movement of the lid assembly 40. The end portion 56 may also define an upper contact surface that faces the lid assembly 40 and extends inwardly at an angle from the locking tab 54, the purposes of which will be explained below. It should be appreciated that the end portions 56 of the locking tabs 54 may be shaped or configured in any manner for a desired application.

Each of the illustrated locking tabs 54 also includes a protrusion 58. The protrusion 58 are configured to facilitate respective pivotable movements of the locking tabs 54, as will be further described and illustrated below. Each of the illustrated protrusions 58 defines a surface that extends inwardly from the associated locking tab 54 at an angle. However, it should be appreciated that the locking tabs 54 may include any structural features or components to facilitate pivotable movement thereof. The protrusions 58 can be integrally formed with the locking tabs 54 or can be separate components that are attached thereto.

The illustrated cup holder assembly 10 also includes a release member 60. The release member 60 is configured to disengage the locking tabs 54 from the lid assemblies 40 which, in turn, releases the lid assemblies 40 to the opened position. To accomplish this, the release member 60 can be disposed within the slot 28 of the base 20 for movement relative to the locking tabs 54. As such, the illustrated release member 60 includes a pair of support pins 62 for pivotably supporting the release member 60 on the base 20, although such is not required. The illustrated support pins 62 are positioned near a first end portion of the release member 60 and configured to be inserted into the hinge supports 26 of the base 20 to form a hinged connection. It should be appreciated, however, that the release member 60 may be supported for movement relative to the base 20 in any manner.

The above-mentioned release button 64 may be provided at the end of the release member 60 opposite the support pins 62. As mentioned above, the release button 64 can be disposed within the enlarged portion of the slot 28 and extend upwardly through the recess 36 of the cover assembly 30. As such, the release button 64 is accessible to a passenger for operation of the cup holder assembly 10, as will be explained below. The release button 64 may have any shape, size, or surface feature that facilitates easy contact therewith by the passenger. The release button 64 may be integrally formed with the release member 60, although such is not required. For example, the release button 64 can be a separate component that is attached to the release member 60 in any manner.

The release member 60 may include one or more flange portions 66, although such are not required. The flange portions 66 are configured to prevent the release member 60 from pivoting beyond a desired position. For example, the flange portions 66 can be separate tabs or a lip that extends outwardly from the release member 60 for contact with the base 20 or the cover assembly 30. The flange portions 66 may, however, be embodied as any structure for preventing pivotable movement of the release member 60 beyond a desired position.

The illustrated release member 60 also includes a pair of contact members 68. The contact members 68 are configured to respectively engage the protrusions 58 of the locking tabs 54 so as to pivot the locking tabs 54 away from one another, as will be described below. Thus, the contact members 68 may define surfaces that are angled opposite the surfaces on the protrusions 58 of the locking tabs 54. As shown, the contact members 68 can be integrally formed with the release member 60 as a single component, although such is not required.

The illustrated cup holder assembly 10 also includes a spring element 70, although such is not required. The spring element 70 is configured to bias the release member 60 toward a first or upward position relative to the base 20. The spring element 70 can be embodied as a compression spring that is positioned between a portion of the base 20 and the release member 60. Alternatively, the spring element 70 can be any component that is configured to bias the release member 60 in a desired position.

Figure 10:
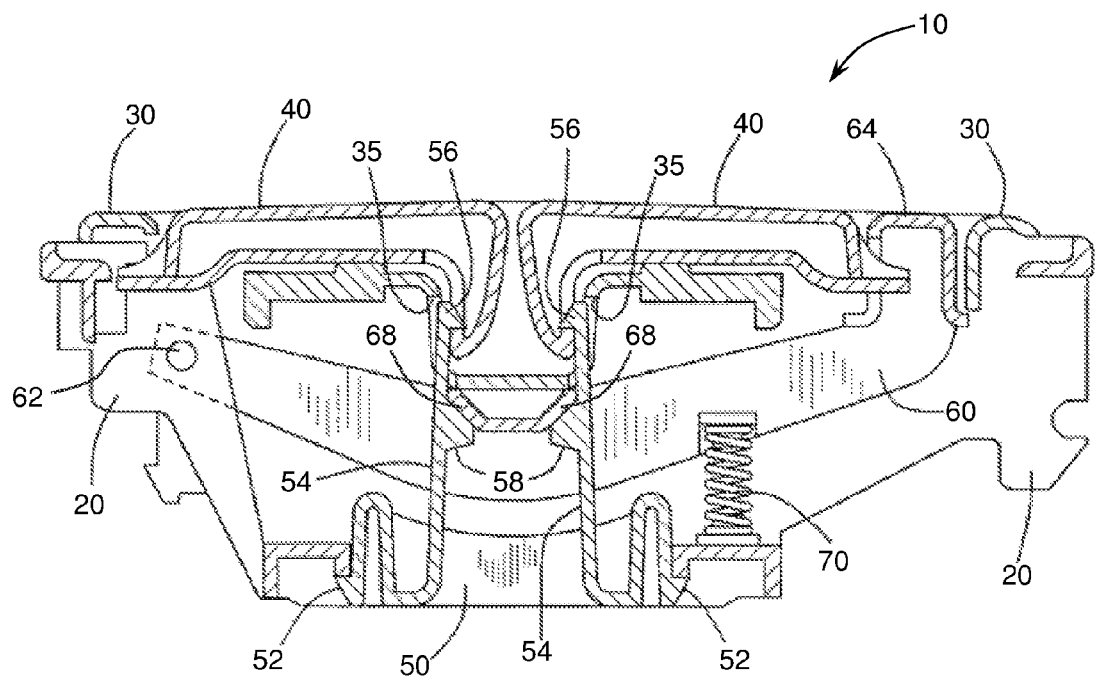
FIG. 10 is a sectional elevational view of the cup holder assembly illustrated in FIGS. 1, 2, and 3 shown in the closed position.

The operation of the cup holder assembly 10 will now be described with reference to FIGS. 10 through 13. As shown in FIG. 10, the lid assemblies 40 are initially retained in their closed positions by the locking mechanism 50. In their closed positions, the end portions 56 of the locking tabs 54 extend through the access holes 35 in the cover assembly 30 for engagement with the respective lid assemblies 40. The illustrated release member 60 is also held in the first position by the spring element 70.

Figure 11:
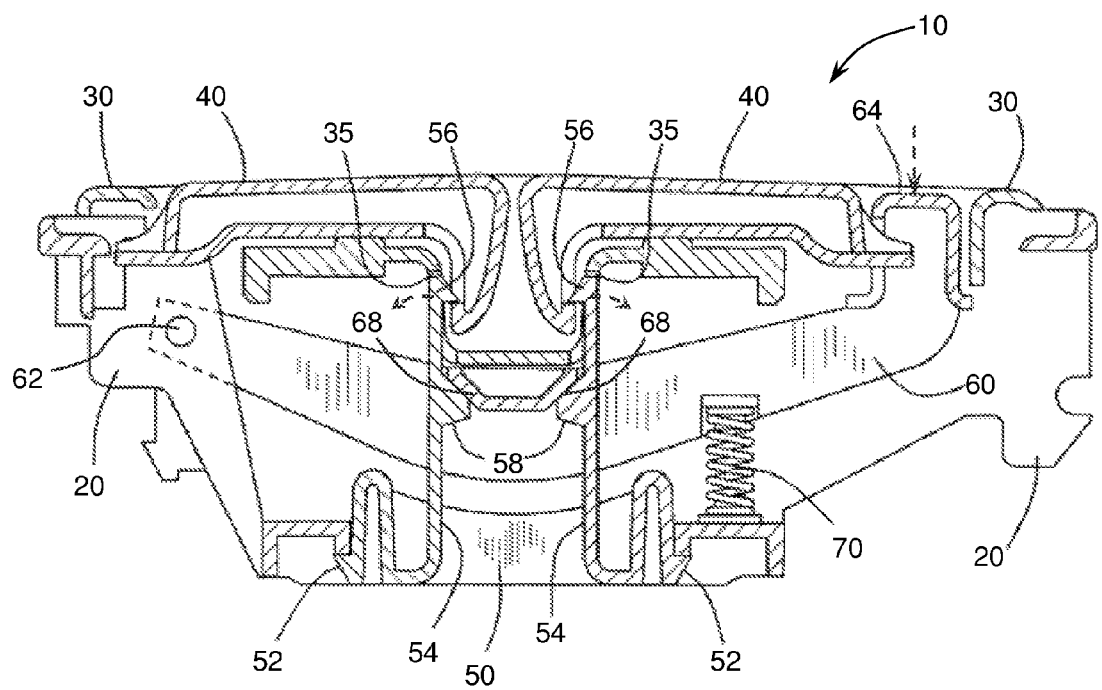
FIG. 11 is a sectional elevational view similar to FIG. 10, wherein a release button is shown in a partially depressed position.

When it is desired to move the lid assemblies from the closed positions to their opened positions, the release member 60 is depressed, such as by manual movement by a driver or a passenger within the vehicle. When this occurs, as shown in FIG. 11, the release member 60 begins to pivot downwardly against the urging of the spring element 70. In doing so, the contact members 68 respectively engage the protrusions 58 of the locking tabs 54 and begin to pivot the locking tabs 54 away from one another in an outward direction, as indicated by the broken arrows.

Figure 12:
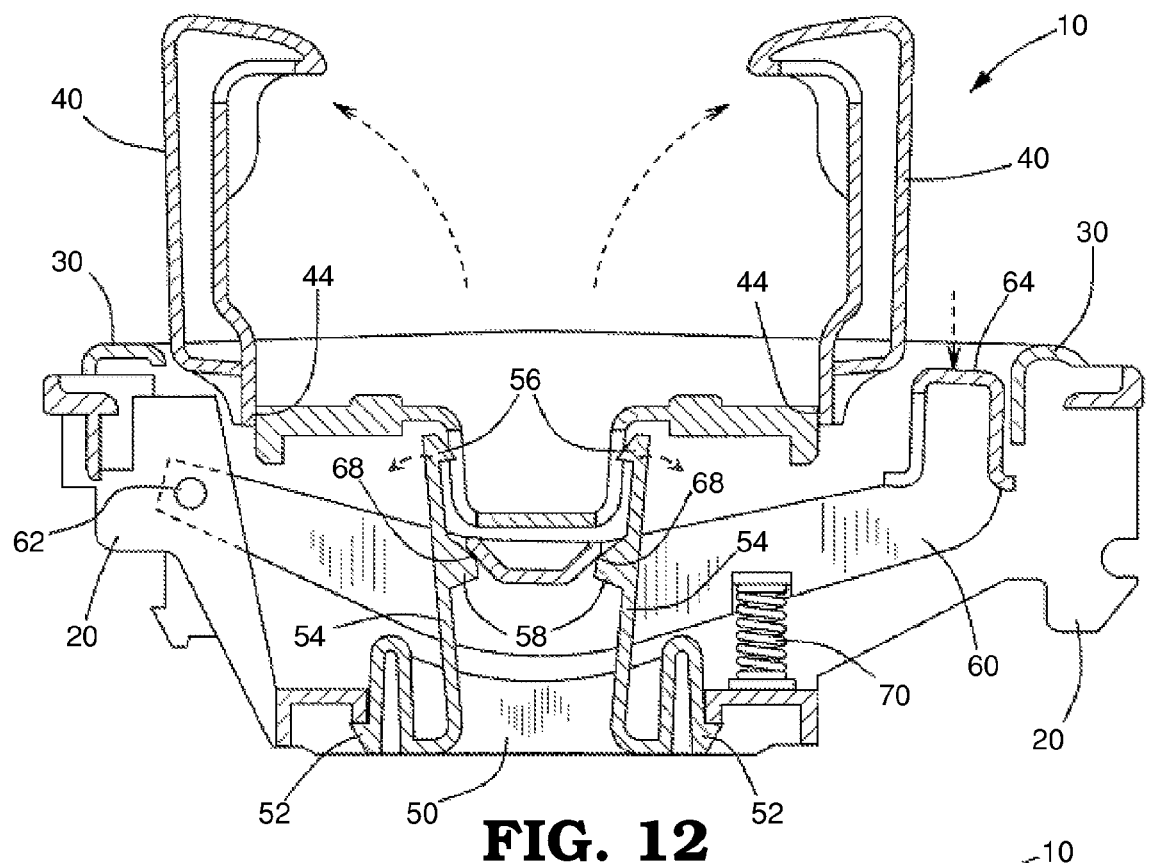
FIG. 12 is a sectional elevational view similar to FIG. 11, wherein the release button is shown in a fully depressed position.

As the release button 64 is continued to be depressed, the locking tabs 54 are further pivoted away from one another, as shown in FIG. 12. When the release member 60 reaches a second or depressed position, the locking tabs 54 become disengaged from the respective lid assemblies 40, thereby allowing the lid assemblies 40 to automatically pivot from their closed positions to their opened positions, as indicated by the broken arrows. The lid assemblies 40 pivot to their opened positions in this manner as a result of the torsion of the spring members 43 (not shown), as described above. Thus, it should be understood that the release member 60 can simultaneously release the pair of lid assemblies 40 by operation of the single release button 64.

Figure 13:
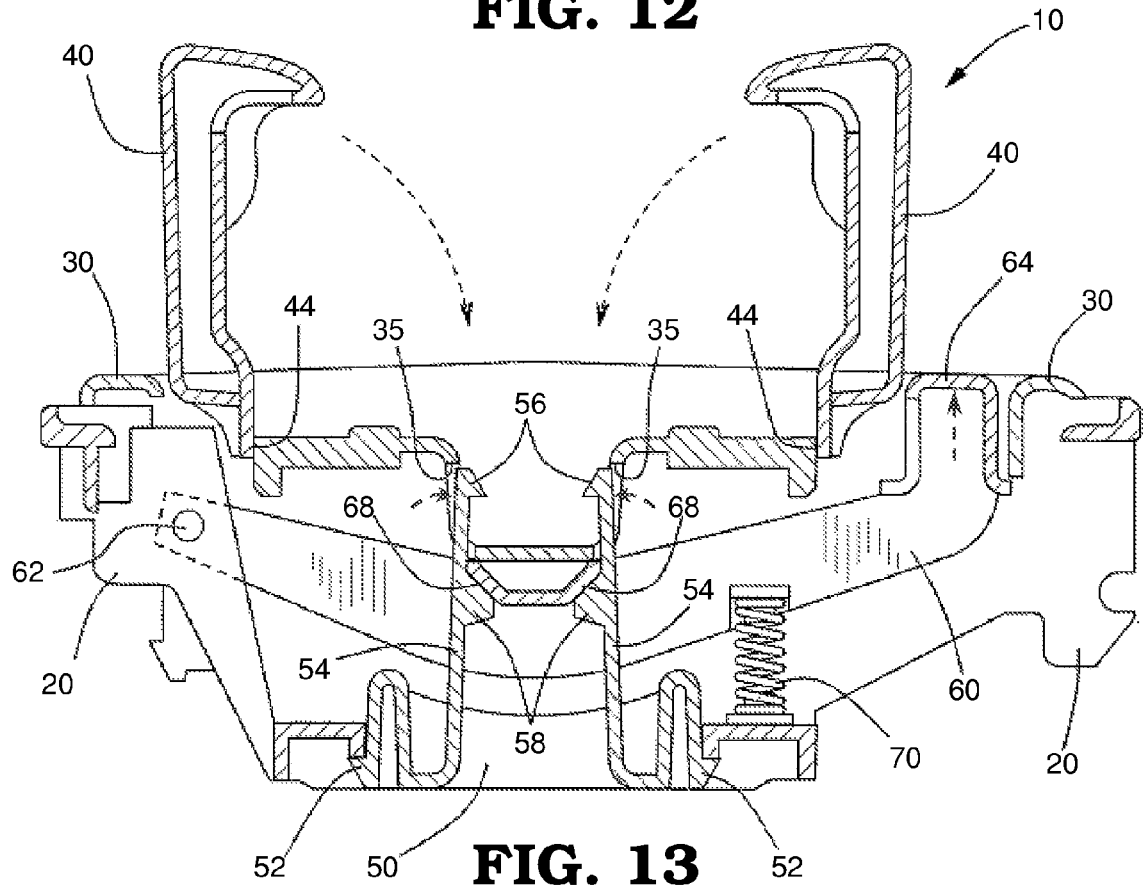
FIG. 13 is a sectional elevational view similar to FIG. 12, wherein the cup holder assembly is shown in the opened position.

As shown in FIG. 13, the release member 60 is automatically pivoted back to the first position by the spring element 70 when the passenger releases the release button 64. Because the contact members 68 are no longer pivoting the locking tabs 54 outwardly, the locking tabs 54 are configured to automatically return to their biased positions, as indicated by the broken arrows.

To close the cup holder assembly 10, the lid assemblies 40 can be manually pivoted to the closed position by the passenger, either simultaneously or individually, as indicated by the broken arrows in FIG. 13. In doing so, portions of the lid assemblies 40 respectively engage the end portions 56 of the locking tabs 54, thereby causing the locking tabs 54 to slightly pivot away from one another. Once the respective lid assemblies 40 have reached a fully closed position, the locking tabs 54 return back to their biased positions. This enables the end portions 56 of the locking tabs 54 to separately engage and secure the respective lid assemblies 40 in the closed position (as shown in FIG. 10). Thus, the locking mechanism 50 functions automatically to secure the lid assemblies 40 in the closed position. It should be appreciated that these steps can be repeated any number of times to operate the cup holder assembly 10 between the closed position and the opened position.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A cup holder assembly comprising:
   a base;
   a pair of lid assemblies that are respectively supported on the base for movement between an opened position and a closed position, wherein the lid assemblies are individually biased toward the opened positions;
   a pair of locking tabs that are supported on the base for movement relative to the lid assemblies, wherein the locking tabs are configured to respectively engage and secure the lid assemblies in the closed position; and
   a release member that is supported on the base for movement relative to the locking tabs, wherein the release member is configured to disengage the locking tabs from the lid assemblies when the release member is moved from a first position to a second position.

2. The cup holder assembly of claim 1, wherein the lid assemblies are mounted to a cover assembly and the cover assembly is secured to the base.

3. The cup holder assembly of claim 1, wherein the lid assemblies each include a spring member for respectively biasing the lid assemblies toward the opened positions.

4. The cup holder assembly of claim 3, wherein each spring member is a torsion spring having an end portion that extends from the lid assembly and engages the base.

5. The cup holder assembly of claim 3, wherein each spring member is secured to the lid assembly such that the spring member is not visible to a passenger when the lid assembly is in the open and closed positions.

6. The cup holder assembly of claim 3, wherein the lid assemblies each include a groove that opens toward an edge thereof and the spring member is disposed within the groove.

7. The cup holder assembly of claim 3, wherein the lid assemblies each include an internal shell and an external shell that are secured together and the spring members are respectively secured therebetween.

8. The cup holder assembly of claim 3, wherein the spring member includes a first end that is biased for engagement with the lid assembly and a second end that extends from the lid assembly for biased engagement with the base.

9. The cup holder assembly of claim 1, wherein the locking tabs are respectively biased for engagement with the lid assemblies when the lid assemblies are in the closed position.

10. The cup holder assembly of claim 1, wherein the locking tabs are inwardly biased toward one another.

11. The cup holder assembly of claim 1, wherein the locking tabs are formed as a single component.

12. The cup holder assembly of claim 1, wherein the release member includes at least one support pin for pivotably supporting the release member on the base.

13. The cup holder assembly of claim 1, wherein the release member is biased in a first position by a spring element.

14. The cup holder assembly of claim 13, wherein the spring element is a compression spring that is positioned between the base and the release member.

15. The cup holder assembly of claim 1, wherein the release member includes a release button that is configured to move the release member from a first position to a second position.

16. The cup holder assembly of claim 1, wherein the release member is configured to disengage the locking tabs from the lid assemblies when the release member is moved from a first position to a second position.

17. The cup holder assembly of claim 1, wherein the release member includes at least one contact member that is configured to contact and move the locking tabs when the release member is moved from a first position to a second position.

18. The cup holder assembly of claim 1, wherein the base includes a receptacle that is covered by the lid assemblies when the lid assemblies are in the closed position and not covered by the lid assemblies when the lid assemblies are in the opened position.

19. The cup holder assembly of claim 1, wherein the release member is a single release member that is configured to disengage both of the pair of locking tabs respectively from of the pair of lid assemblies substantially simultaneously when the single release member is moved from the first position to the second position.

20. A cup holder assembly comprising:
a base;
a pair of lid assemblies that are respectively supported on the base for movement between an opened position and a closed position, wherein the lid assemblies each include a spring member that is mounted thereto for individually biasing the lid assemblies in the opened position;
a pair of locking tabs that are supported on the base for movement relative to the lid assemblies, wherein the locking tabs are biased in a position to separately engage and secure the lid assemblies in the closed position; and
a release member that is supported on the base for movement relative to the locking tabs, wherein the release member is configured to contact and disengage the locking tabs from the lid assemblies when the release member is moved from a first position to a second position.

21. The cup holder assembly of claim 20, wherein the lid assemblies each form a groove that opens toward an edge thereof, and the spring member is a torsion spring that is disposed within the groove such that the spring member is not visible to a passenger when the respective lid assembly is in the open and closed positions.

22. The cup holder assembly of claim 20, wherein the lid assemblies each include an internal shell and an external shell that are secured together, and the spring member is secured therebetween such that a first end of the spring member is biased for engagement with the respective lid assembly and a second end of the spring member extends from the lid assembly for biased engagement with the base.

* * * * *